United States Patent
Song et al.

(10) Patent No.: US 12,231,202 B2
(45) Date of Patent: Feb. 18, 2025

(54) PHASE SHIFT METHOD USING PHASE SHIFTER AND FREQUENCY QUADRUPLER, AND DEVICE PERFORMING SAME

(71) Applicant: POSTECH RESEARCH AND BUSINESS DEVELOPMENT FOUNDATION, Pohang-si (KR)

(72) Inventors: Ho Jin Song, Pohang-si (KR); Hyeon Uk Son, Pohang-si (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 0 days.

(21) Appl. No.: 18/258,783

(22) PCT Filed: Dec. 29, 2021

(86) PCT No.: PCT/KR2021/020187
§ 371 (c)(1),
(2) Date: Jun. 21, 2023

(87) PCT Pub. No.: WO2022/146037
PCT Pub. Date: Jul. 7, 2022

(65) Prior Publication Data
US 2024/0048199 A1    Feb. 8, 2024

(30) Foreign Application Priority Data

Dec. 29, 2020  (KR) .................. 10-2020-0186702
Dec. 9, 2021   (KR) .................. 10-2021-0176124

(51) Int. Cl.
*H04L 23/02*    (2006.01)
*H04B 7/0426*   (2017.01)
*H04B 7/06*     (2006.01)

(52) U.S. Cl.
CPC .......... *H04B 7/0617* (2013.01); *H04B 7/043* (2013.01)

(58) Field of Classification Search
CPC ...... H04N 19/60; H04N 19/162; H04N 19/98; H03L 7/08; H03L 7/091; H04L 25/03159;
(Continued)

(56) References Cited

U.S. PATENT DOCUMENTS 2,614,221 A * 10/1952 Moll .................. H03L 7/06
                                                 331/25
10,567,063 B1 * 2/2020 Bakeer ................ H04B 7/0682
(Continued)

FOREIGN PATENT DOCUMENTS

JP   2013-118620 A    6/2013
KR   10-1995-0016112 A    6/1995
(Continued)

OTHER PUBLICATIONS

Office Action dated Jan. 11, 2023 of KR Application No. 10-2021-0176124 (3 pages).
(Continued)

*Primary Examiner* — Khai Tran
(74) *Attorney, Agent, or Firm* — Morgan, Lewis & Bockius LLP

(57) ABSTRACT

Disclosed are a phase shift method and a device performing same, the method comprising the steps of: shifting a phase of an input signal by a phase shifter, and up-converting, by a frequency quadrupler, a frequency of the input signal of which the phase has been shifted, by a multiplication coefficient (N). According to the phase shift method and the device performing same, it is possible to overcome a phase resolution decrease that occurs when passing through a
(Continued)

frequency quadrupler in super high-frequency LO beamforming technology synchronized with a conventional frequency quadrupler.

10 Claims, 7 Drawing Sheets

(58) Field of Classification Search
CPC ..... H04L 27/367; H04L 27/16; H04B 7/0617; H04B 1/26
USPC .......................................... 375/262, 260, 267
See application file for complete search history.

(56) References Cited

U.S. PATENT DOCUMENTS

2020/0200867 A1* 6/2020 Belfiore ................. H03B 19/14
2020/0313063 A1* 10/2020 Pollanen .................. H01P 3/06

FOREIGN PATENT DOCUMENTS

| KR | 10-2002-0024660 A | 4/2002 |
| KR | 10-2003-0053282 A | 6/2003 |
| KR | 10-2011-0069660 A | 6/2011 |
| KR | 10-1097406 B1 | 12/2011 |
| KR | 10-1971685 B1 | 4/2019 |
| KR | 10-2019082 A | 9/2019 |

OTHER PUBLICATIONS

Notice of Decision dated May 15, 2023 of KR Application No. 10-2021-0176124 (2 pages).
International search report and written opinion dated Apr. 6, 2022 of PCT Application No. PCT/KR2021/020187 with partial translation (8 pages).

* cited by examiner

PHASE SHIFT METHOD USING PHASE SHIFTER AND FREQUENCY QUADRUPLER, AND DEVICE PERFORMING SAME

CROSS-REFERENCE TO RELATED APPLICATIONS

This is a national stage application of International Application No. PCT/KR2021/020187, filed on Dec. 29, 2021, which claims the benefit of Korean Patent Application No. 10-2020-0186702 filed on Dec. 29, 2020, and Korean Patent Application No. 10-2021-0176124 filed on Dec. 9, 2021, the entirety of each of which is incorporated herein by reference for all purposes.

TECHNICAL FIELD

The present disclosure relates to a phase shift method using a phase shifter and a frequency multiplier and a device performing the same.

BACKGROUND ART

Recently, along with the increase of commercial needs for millimeter wave application systems, such as next-generation 5G wireless mobile communication networks and radar systems for autonomous vehicles and autonomous drones, phased array antennas and beamforming technologies are getting attention for efficient implementation of high-speed data transmission.

The beamforming technology may be divided into two main types depending on its structure: a direct conversion structure that performs beamforming at radio frequency (RF) and a superheterodyne structure that performs beamforming at the intermediate frequency (IF) or at the local oscillator (LO) frequency.

To obtain phase resolving in the range of 0° to 360° in beamforming, a phase shifter with phase resolution in the range of 0° to 360° may be used, or phase resolving of a phase shifter may be performed for a single quadrant (e.g., 0° to 90°) and extended to the range of 0° to 360° using a quadrupler.

The RF beamformer has an advantage in that it may be implemented in a simplified structure; since beamforming has to be performed in the radio frequency (RF) band, however, insertion loss of a phase shifter increases, which necessitates utilization of a high-gain amplifier to obtain satisfactory signal-to-noise ratio (SNR).

In the case of using the LO phase beamforming structure in the ultra-high frequency band, an N-times frequency multiplier is generally used. For example, if N=4 and the phase is controlled at $f_{LO}/4$, phase resolution of the phase shifter at the front of the multiplier has to be n+2 bits ($360°/2^{n+2}$) for a signal that has passed the quadrupler to obtain phase resolution of n-bits ($360°/2^n$). Therefore, achieving high phase resolution in the above structure requires finer phase resolution, which is difficult to obtain.

PRIOR ART REFERENCES (Patent 1) Korean laid-open patent No. 10-2011-0069660 (Jun. 23, 2011)

DISCLOSURE

Technical Problem

An object of the present disclosure is to provide a phase shift method capable of overcoming a phase resolution decrease in the ultra-high frequency LO beamforming technology based on a conventional frequency multiplier when a signal passes the frequency multiplier and a device that performs the method.

However, the technical problem to be solved by the present disclosure is not limited to the above but may be extended to other various problems belonging to the scope not departing from the technical principles and domain of the present disclosure.

Technical Solution

A phase shift method according to one embodiment of the present disclosure comprises shifting phase of an input signal by a phase shifter and up-converting frequency of the input signal with shifted phase by a multiplication coefficient N by a frequency multiplier.

According to one aspect, phase resolution (°) of the phase shifter may be determined by $$\frac{360°}{2^n + x}$$

In the equation above, n represents phase resolution (bits) of the phase shifter, and x represents the number of shifted phase states.

According to one aspect, the total phase resolution (°) for a signal that has passed the frequency multiplier may be determined by $$\frac{360° \times N}{2^n + x}$$

In the equation above, n represents phase resolution (bits) of the phase shifter, x represents the number of shifted phase states, and N represents the multiplication coefficient.

According to one aspect, the number of shifted phase states x may be determined to have a value at which phase overlapping does not occur regardless of the multiplication coefficient N.

According to one aspect, the frequency multiplier may include a frequency doubler.

According to one aspect, the method may further include amplifying the size of an input signal with shifted phase by an amplifier after the shifting of phase of the input signal.

A phase shift device according to another embodiment of the present disclosure comprises a phase shifter shifting the phase of an input signal and a frequency multiplier up-converting the frequency of the input signal with shifted phase by a multiplication coefficient N.

According to one aspect, the phase resolution (°) of the phase shifter may be determined by $$\frac{360°}{2^n + x}$$

In the equation above, n represents phase resolution (bits) of the phase shifter, and x represents the number of shifted phase states.

According to one aspect, the total phase resolution (°) for a signal that has passed the frequency multiplier may be determined by $$\frac{360° \times N}{2^n + x}$$

In the equation above, n represents phase resolution (bits) of the phase shifter, x represents the number of shifted phase states, and N represents the multiplication coefficient.

According to one aspect, the number of shifted phase states x may be determined to have a value at which phase overlapping does not occur regardless of the multiplication coefficient N.

According to one aspect, the frequency multiplier may include a frequency doubler.

According to one aspect, the device may further include an amplifier amplifying the size of an input signal with shifted phase.

Advantageous Effects

The present disclosure provides the following effects. However, since it is not meant that a specific embodiment has to provide all of or only the following effects, the technical scope of the present disclosure should not be regarded as being limited by the specific embodiment.

According to the phase shift method according to the embodiments of the present disclosure and the device performing the method, it is possible to overcome a phase resolution decrease in the ultra-high frequency LO beamforming technology based on a conventional frequency multiplier when a signal passes the frequency multiplier.

Also, since phase shift of a signal is performed at a low frequency, insertion loss of the phase shifter may be reduced, which is advantageous in securing the overall SNR of the system, and higher phase resolution may be obtained compared to the prior art with a similar level of complexity while maintaining phase resolving in the range of 0° to 360°.

MODE FOR DISCLOSURE

Since the present disclosure may be modified in various ways and may provide various embodiments, specific embodiments will be depicted in the appended drawings and described in detail with reference to the drawings.

However, it should be understood that the specific embodiments are not intended to limit the gist of the present disclosure; rather, it should be understood that the specific embodiments include all of the modifications, equivalents, or substitutes belonging to the technical principles and scope of the present disclosure.

Terms such as "first" and "second" may be used to describe various constituting elements, but the constituting elements should not be limited by the terms. The terms are introduced to distinguish one element from the others. For example, without departing from the technical scope of the present disclosure, a first element may be referred to as a second element, and similarly, the second element may be referred to as the first element.

If a constituting element is said to be "connected" or "attached" to other constituting element, the former may be connected or attached directly to the other constituting element, but there may be a case in which another constituting element is present between the two constituting elements. On the other hand, if a constituting element is said to be "directly connected" or "directly attached" to other constituting element, it should be understood that there is no other constituting element between the two constituting elements.

Terms used in the present disclosure are intended only for describing a specific embodiment and are not intended to limit the technical scope of the present disclosure. A singular expression should be understood to indicate a plural expression unless otherwise explicitly stated. The term "include" or "have" is used to indicate existence of an embodied feature, number, step, operation, element, component, or a combination thereof; and should not be understood to preclude the existence or possibility of adding one or more other features, numbers, steps, operations, elements, components, or a combination thereof.

Unless defined otherwise, all the terms used in the present disclosure, including technical or scientific terms, provide the same meaning as understood generally by those skilled in the art to which the present disclosure belongs. Those terms defined in ordinary dictionaries should be interpreted to have the same meaning as conveyed in the context of related technology. Unless otherwise defined explicitly in the present disclosure, those terms should not be interpreted to have ideal or excessively formal meaning.

In what follows, with reference to appended drawings, preferred embodiments of the present disclosure will be described clearly and in detail so that those skilled in the art to which the present disclosure belongs may implement the present disclosure easily.

Figure 1A:
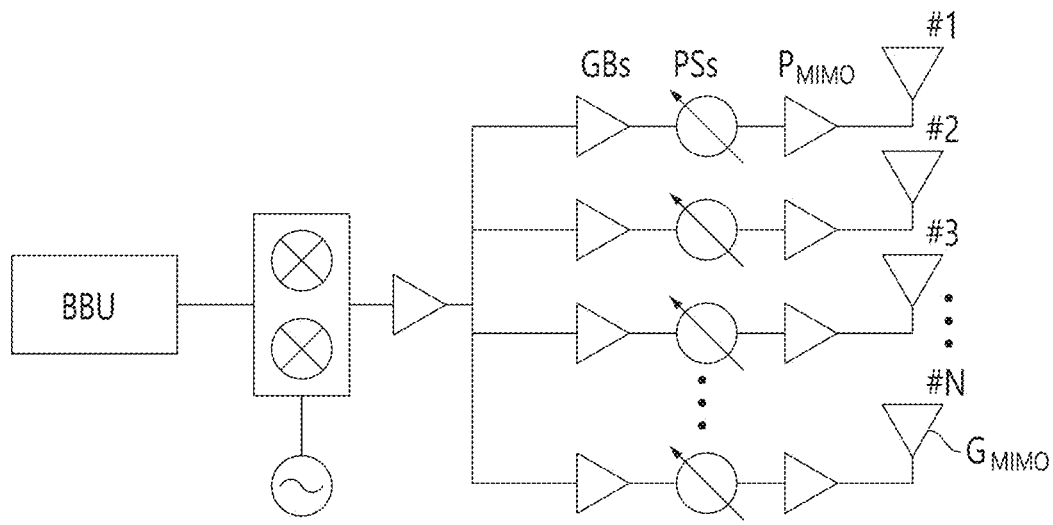
FIGS. 1(a) and 1(b) illustrate a direct conversion structure and a superheterodyne structure.
Figure 1B:
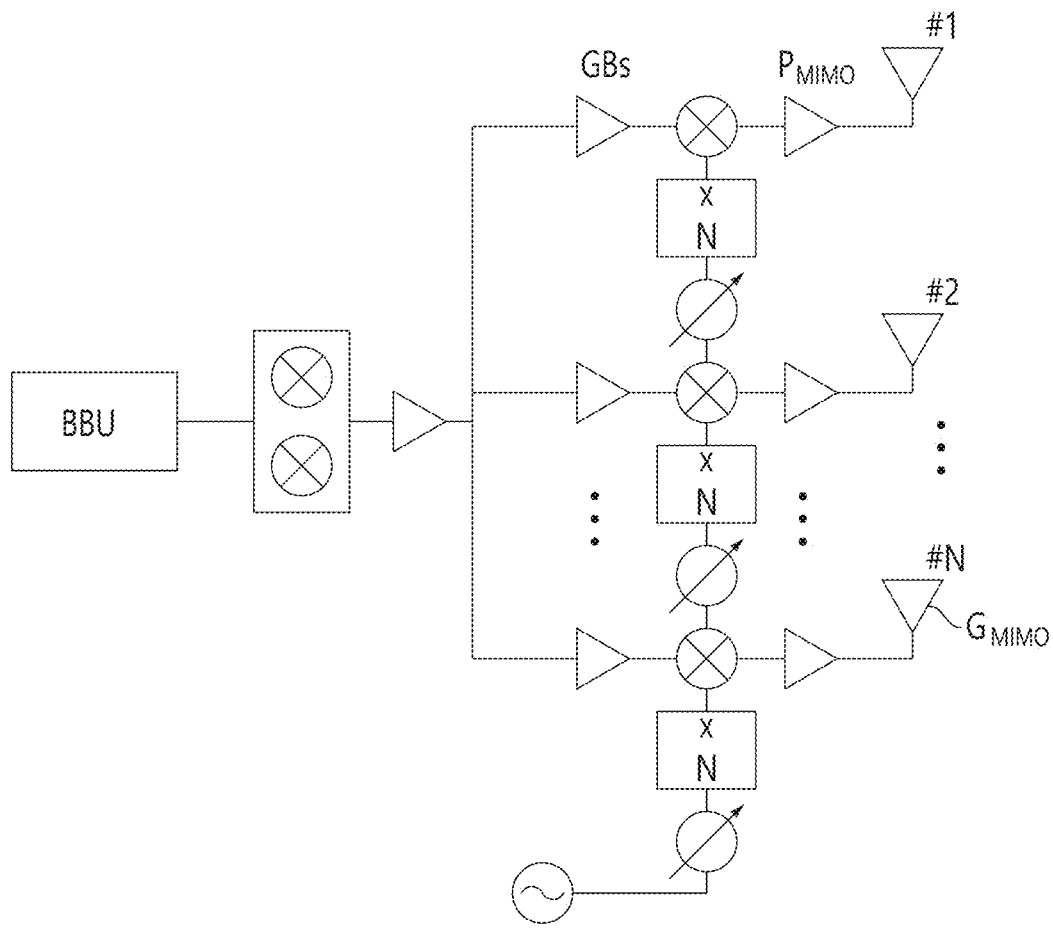

FIGS. 1(a) and 1(b) illustrate a direct conversion structure and a superheterodyne structure.

FIG. 1(a) illustrates the direct conversion structure that performs beamforming in the radio frequency (RF) band, and FIG. 1(b) illustrates the superheterodyne structure that performs beamforming at the intermediate frequency (IF) or local oscillator (LO) frequency.

The beamformer based on the direct conversion structure has an advantage in that it may be implemented in a simplified structure; since beamforming has to be performed in the radio frequency (RF) band, however, insertion loss of a phase shifter increases, which necessitates utilization of a high-gain amplifier to obtain satisfactory signal-to-noise ratio (SNR).

When a frequency multiplier is used to increase the frequency after a signal passes a phase shifter in the superheterodyne structure, all cases of using a frequency multiplier, including a doubler but excluding a tripler, obtain phase resolution lower than that of the phase shifter. When the phase resolution of the phase shifter is n bits ($360°/2^n$), and a signal passes a frequency multiplier that includes a frequency doubler once, the phase resolution is reduced to n−1 bits ($360°/2^{n-1}$).

Figure 2A:
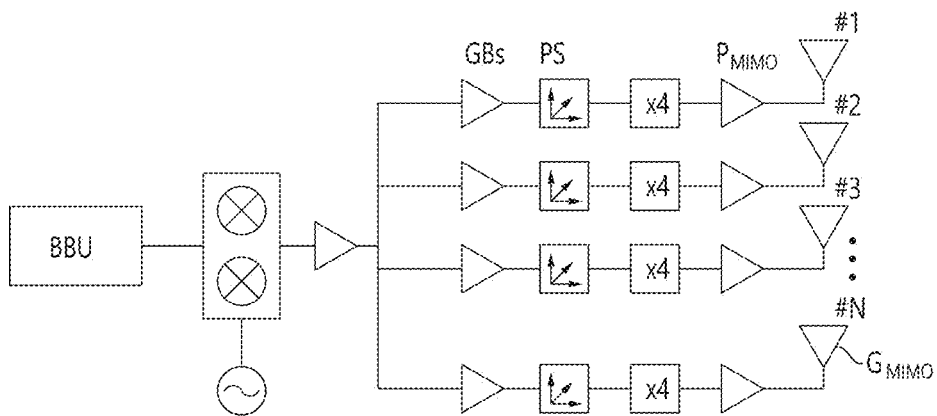
FIGS. 2(a), 2(b), and 2(c) illustrate a phase shift method using a frequency quadrupler.
Figure 2B:
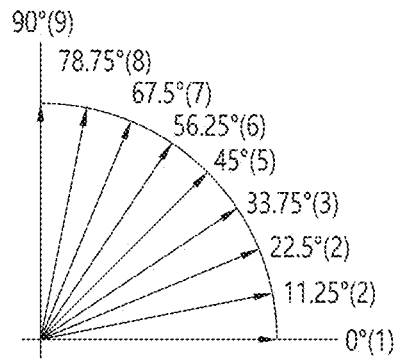
Figure 2C:
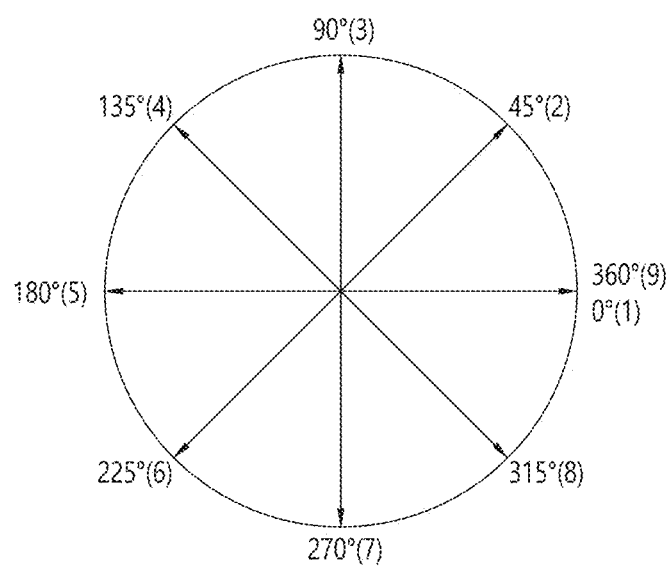

FIGS. 2(a), 2(b), and 2(c) illustrate a phase shift method using a frequency quadrupler.

Referring to FIGS. 2(a), 2(b), and 2(c), the phase shift method using a frequency quadrupler performs (PS of FIG. 2(a)) phase resolving of the phase shifter on a single quadrant (e.g., 0° to 90°) and extends the phase shift to the range of 0° to 360° using the frequency quadrupler (X4 block of FIG. 2(a)).

For example, to obtain the phase resolution as shown in FIG. 2(c), phase resolving is performed in the single quadrant, as shown in FIG. 2(b), which is subsequently extended to the range of 0° to 360° using a frequency quadrupler. Here, to obtain the phase resolution of 3 bits (45°), phase resolution of 5 bits (11.25°) is required in the single quadrant before a signal passes the frequency quadrupler.

In other words, for a signal which has passed the frequency quadrupler to obtain the phase resolution of n bits ($360°/2^n$) according to the structure based on the frequency quadrupler, the phase resolution of the phase shifter has to be n+2 bits ($360°/2^{n+2}$). Therefore, achieving high phase resolution in the above structure requires finer phase resolution, which is difficult to obtain.

Figure 3A:
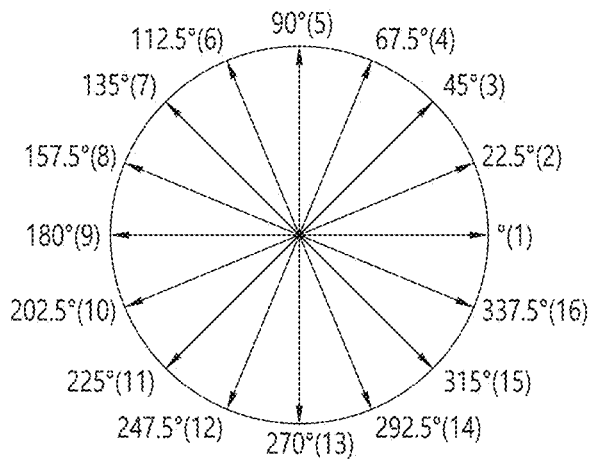
FIGS. 3(a), 3(b), and 3(c) illustrate a decrease in phase resolution when a phase shift method based on the superheterodyne structure utilizes a frequency doubler.
Figure 3B:
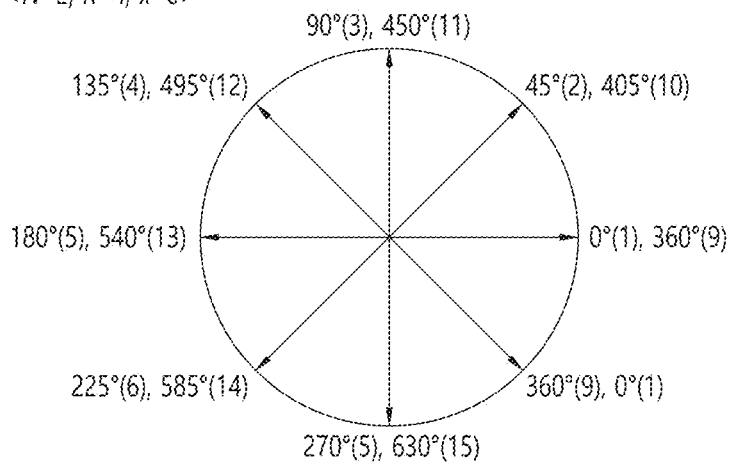
Figure 3C:
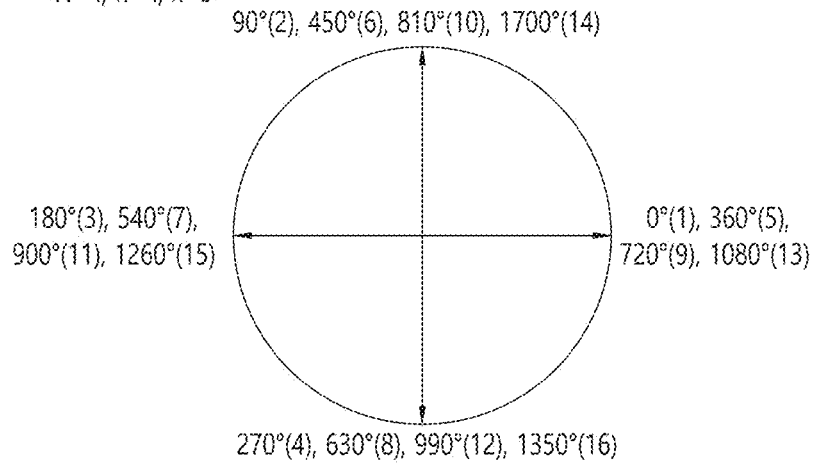

FIGS. 3(a), 3(b), and 3(c) illustrate a decrease in phase resolution when a phase shift method based on the superheterodyne structure utilizes a frequency doubler.

When a frequency multiplier is used to increase the frequency after a signal passes a phase shifter in the superheterodyne structure, all cases of using a frequency multiplier, including a doubler but excluding a tripler, obtain phase resolution lower than that of the phase shifter. When the phase resolution of the phase shifter is n bits ($360°/2^n$), and a signal passes a frequency multiplier that includes a frequency doubler once, the final phase resolution is reduced to n−1 bits ($360°/2^{n-1}$); when a signal passes a frequency multiplier that includes the frequency doubler a times, the phase resolution is reduced to n−a bits ($360°/2^{n-a}$).

For example, as shown in FIG. 3(a), assuming that a frequency doubler is applied to the signal which has passed the phase shifter of 4 bits (22.5°), the phase resolution is reduced to 3 bits (45°) when a frequency multiplier (N=2) that includes a frequency doubler once, while the phase resolution is reduced to 2 bits (90°) when the frequency multiplier (N=4) that includes the frequency doubler twice, as shown in FIG. 3(c).

Figure 4:
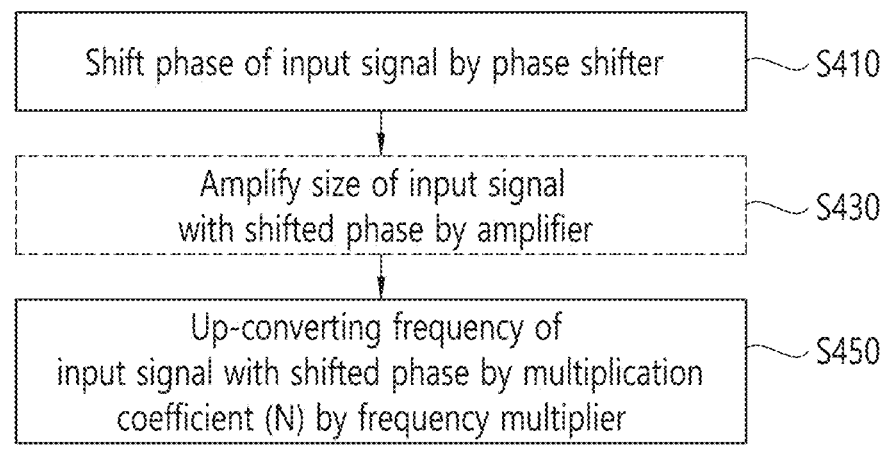
FIG. 4 is a flow diagram illustrating a phase shift method according to one embodiment of the present disclosure.

FIG. 4 is a flow diagram illustrating a phase shift method according to one embodiment of the present disclosure.

Referring to FIG. 4, in the S410 step, the phase shifter shifts the phase of an input signal. The phase shifter may shift the phase of an input signal through an electrical or mechanical means. The phase resolution (°) of the phase shifter may be expressed by Eq. 1.

$$\frac{360°}{2^n + x} \quad [\text{Eq. 1}]$$

In Eq. 1, n represents phase resolution (bits) of the phase shifter, and x represents the number of shifted phase states.

In the S430 step, an amplifier amplifies the size of the input signal with shifted phase. The S430 step may be selectively applied according to the required signal size.

In the S450 step, the frequency multiplier up-converts the frequency of the input signal with shifted phase by a multiplication coefficient N. The total phase resolution (°) for a signal that has passed the frequency multiplier may be determined by Eq. 2.

$$\frac{360° \times N}{2^n + x} \quad [\text{Eq. 2}]$$

In Eq. 2, n represents phase resolution (bits) of the phase shifter, x represents the number of shifted phase states, and N represents the multiplication coefficient.

Referring to Eq. 2, when the number of shifted phase states x is 0, the actual value of the total phase resolution is reduced as phases overlap depending on the multiplication coefficient N, as shown in FIGS. 3(a), 3(b), and 3(c), except for the case in which a frequency tripler is employed (i.e., N≠3, 9, . . . ).

Therefore, if the number of shifted phase states x is determined to have a value at which phase overlapping does not occur regardless of the multiplication coefficient N in Eq. 2, the total phase resolution may be kept to its original value.

Figure 5A:
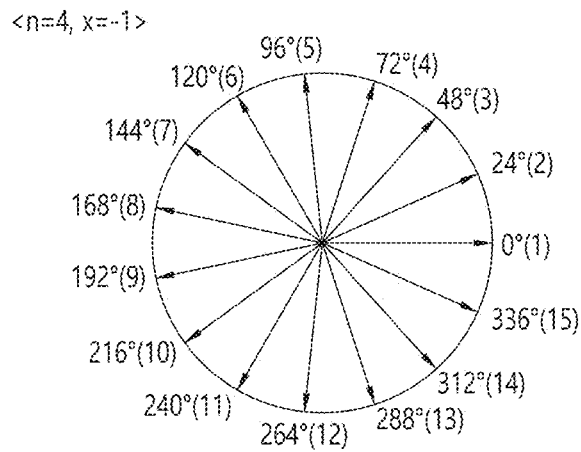
FIGS. 5(a), 5(b), and 5(c) illustrate phase resolution when the number of shifted phase states x is −1.
Figure 5B:
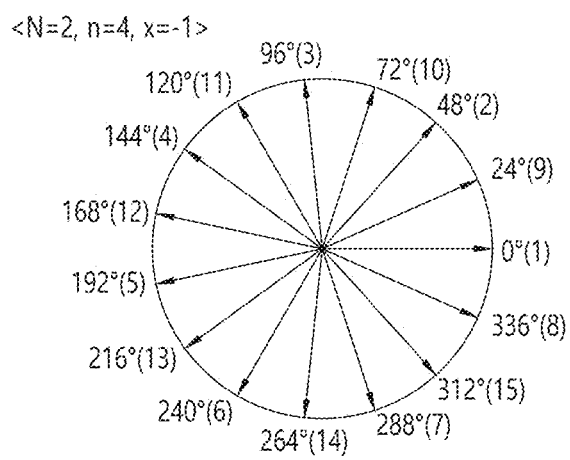
Figure 5C:
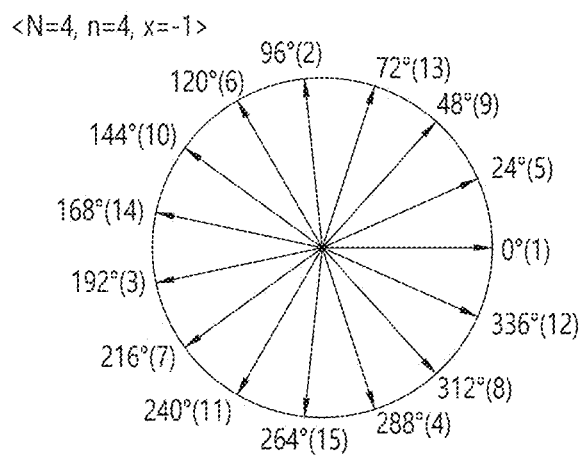

FIGS. 5(a), 5(b), and 5(c) illustrate phase resolution when the number of shifted phase states x is −1.

FIG. 5(a) shows the phase resolution (°) of the phase shifter according to Eq. 1 when the phase resolution (bits) of the phase shifter is 4 bits, FIG. 5(b) shows the total phase resolution (°) according to Eq. 2 when a frequency multiplier (N=2) including a frequency doubler once is used, and FIG. 5(c) shows the total phase resolution (°) according to Eq. 2 when a frequency multiplier (N=4) including a frequency doubler twice is used.

Different from the example of FIG. 4, when the number of shifted phase states x is −1, it may be checked that phase overlapping does not occur even if a frequency multiplier including a frequency doubler is used; therefore, the total phase resolution may be kept to its original value.

Figure 6A:
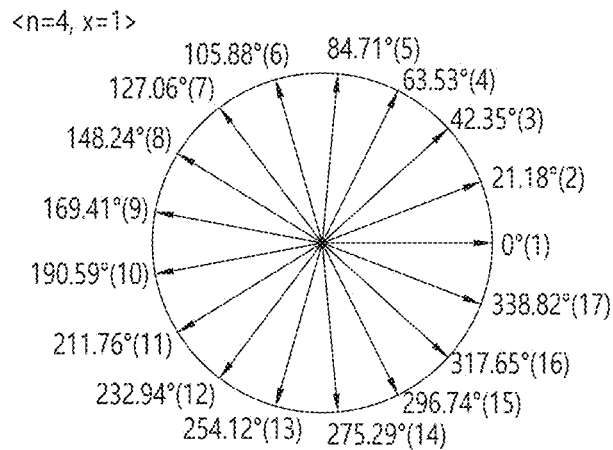
FIGS. 6(a), 6(b), and 6(c) illustrate phase resolution when the number of shifted phase states x is +1.
Figure 6B:
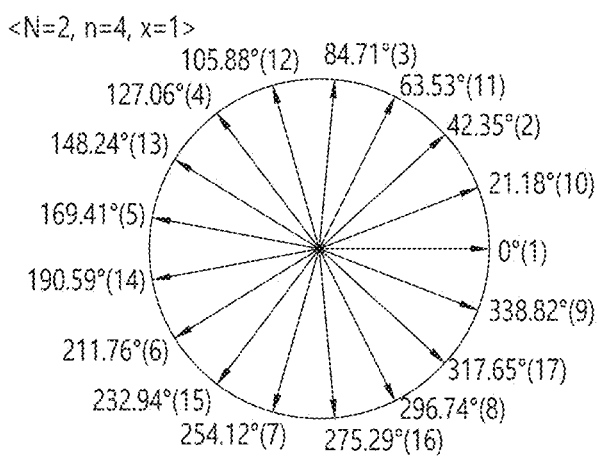
Figure 6C:
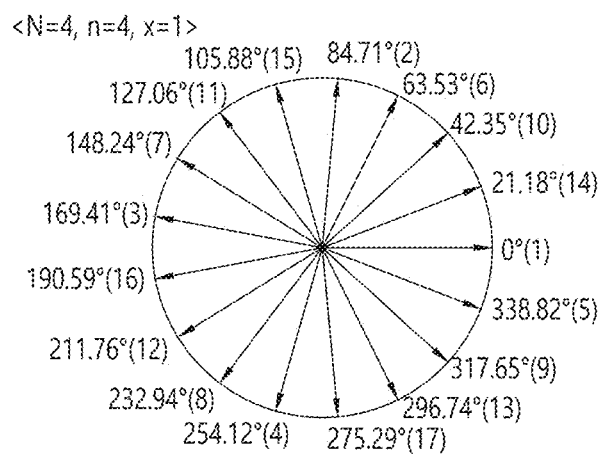

FIGS. 6(a), 6(b), and 6(c) illustrate phase resolution when the number of shifted phase states x is +1.

FIG. 6(a) shows the phase resolution (°) of the phase shifter according to Eq. 1 when the phase resolution (bits) of the phase shifter is 4 bits, FIG. 6(b) shows the total phase resolution (°) according to Eq. 2 when a frequency multiplier (N=2) including a frequency doubler once is used, and FIG. 6(c) shows the total phase resolution (°) according to Eq. 2 when a frequency multiplier (N=4) including a frequency doubler twice is used.

In the same way as described with reference to FIGS. 5(a), 5(b), and 5(c), when the number of shifted phase states x is 1, it may be checked that phase overlapping does not occur even if a frequency multiplier including a frequency doubler is used; therefore, the total phase resolution may be kept to its original value.

The conventional phase shifter requires a controller with a higher number of control bits to produce, for example, 4-bit phase resolution (22.5°). The aforementioned feature may be noticed by examining the x-axis and y-axis values of 16 points corresponding to the 4-bit phase signal in FIG. 3(a). The x-axis and y-axis values are not equally spaced from each other. In other words, to create 16 phase states, an actual controller needs to have high resolution corresponding to the minimum required control signal (voltage).

Meanwhile, according to the phase shift method based on one embodiment of the present disclosure, the x-axis and y-axis values of 16 points corresponding to the 4-bit phase signals shown in FIG. 5(a) and FIG. 6(a) are not significantly different from the x-axis and y-axis values of 16 points corresponding to the 4-bit phase signal shown in FIG. 3(a). Therefore, according to the phase shift method based on one embodiment of the present disclosure, phase control with higher resolution than the conventional phase shifter may be performed without designing an additional controller.

Figure 7:
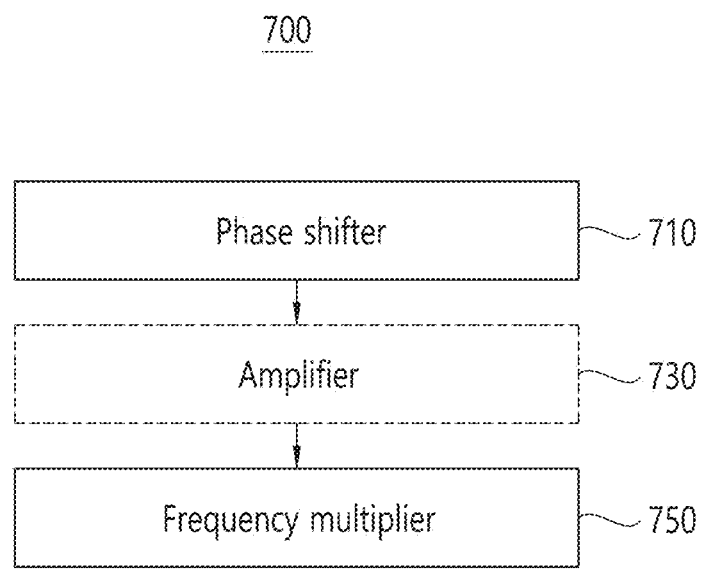
FIG. 7 illustrates the structure of a phase shift device according to one embodiment of the present disclosure.

FIG. 7 illustrates the structure of a phase shift device according to one embodiment of the present disclosure.

Referring to FIG. 7, the phase shift device 700 according to one embodiment of the present disclosure may include a phase shifter 710, an amplifier 730, and a frequency multiplier 750.

The phase shifter 710 shifts the phase of an input signal. The phase shifter 710 may shift the phase of an input signal through an electrical or mechanical means. The phase resolution (°) of the phase shifter may be expressed by Eq. 1.

The amplifier 730 amplifies the size of the input signal with shifted phase. The amplifier 730 may be selectively used according to the required signal size.

The frequency multiplier 750 up-converts the frequency of the input signal with shifted phase by a multiplication coefficient N. The total phase resolution (°) for a signal that has passed the frequency multiplier may be determined by Eq. 2.

Referring to Eq. 2, when the number of shifted phase states x is 0, the actual value of the total phase resolution is reduced as phases overlap depending on the multiplication coefficient N, as shown in FIGS. 3(a), 3(b), and 3(c), except for the case in which a frequency tripler is employed (i.e., N≠3, 9, . . . ).

Therefore, if the number of shifted phase states x is determined to have a value at which phase overlapping does not occur regardless of the multiplication coefficient N in Eq. 2, the total phase resolution may be kept to its original value.

The phase shift method according to the present disclosure may be implemented in the form of computer-readable codes in a computer-readable recording medium. The computer-readable recording medium includes all kinds of recording devices storing data that may be read by a computer system. Examples of a computer-readable recording medium include a Read Only Memory (ROM), a Random Access Memory (RAM), a magnetic tape, a magnetic disk, a flash memory, and an optical data storage device. Also, the computer-readable recording medium may be distributed over computer systems connected to each other through a computer communication network and may be stored and executed as readable codes in a distributed manner.

In the above, the present disclosure has been described with reference to appended drawings and embodiments, but the technical scope of the present disclosure is not limited to the drawings or embodiments. Rather, it should be understood by those skilled in the art to which the present disclosure belongs that the present disclosure may be modified or changed in various ways without departing from the technical principles and scope of the present disclosure described by the appended claims below.

DESCRIPTIONS OF SYMBOLS

700: Phase shift device
710: Phase shifter
730: Amplifier
750: Frequency multiplier

The invention claimed is:

1. A phase shift method, comprising:
shifting phase of an input signal by a phase shifter; and
up-converting frequency of the input signal with shifted phase by a multiplication coefficient N by a frequency multiplier,
wherein phase resolution (°) of the phase shifter is determined by $$\frac{360°}{2^n + x}$$

wherein n represents phase resolution (bits) of the phase shifter, and x represents a number of shifted phase states.

2. The method of claim 1, wherein a total phase resolution (°) for a signal that has passed the frequency multiplier is determined by $$\frac{360° \times N}{2^n + x}$$

wherein n represents phase resolution (bits) of the phase shifter, x represents the number of shifted phase states, and N represents a multiplication coefficient.

3. The method of claim 2, wherein the number of shifted phase states x is determined to have a value at which phase overlapping does not occur regardless of the multiplication coefficient N.

4. The method of claim 1, wherein the frequency multiplier includes a frequency doubler.

5. The method of claim 1, further comprising:
amplifying a size of the input signal with shifted phase by an amplifier after the shifting of phase of the input signal.

6. A phase shift device, comprising:
a phase shifter shifting phase of an input signal; and
a frequency multiplier up-converting frequency of the input signal with shifted phase by a multiplication coefficient N,
wherein phase resolution (°) of the phase shifter is being determined by $$\frac{360°}{2^n + x},$$

wherein n represents phase resolution (bits) of the phase shifter, and x represents a number of shifted phase states.

7. The device of claim 6, wherein a total phase resolution (°) for a signal that has passed the frequency multiplier is determined by $$\frac{360° \times N}{2^n + x}$$

wherein n represents phase resolution (bits) of the phase shifter, x represents the number of shifted phase states, and N represents a multiplication coefficient.

8. The device of claim 7, wherein the number of shifted phase states x is determined to have a value at which phase overlapping does not occur regardless of the multiplication coefficient N.

9. The device of claim 6, wherein the frequency multiplier includes a frequency doubler.

10. The device of claim 6, further comprising:
an amplifier amplifying a size of the input signal with shifted phase.

* * * * *